(12) United States Patent
Das et al.

(10) Patent No.: US 7,163,718 B2
(45) Date of Patent: Jan. 16, 2007

(54) METHOD OF SELECTIVE REGION VAPOR PHASE ALUMINIZING

(75) Inventors: Nripendra Nath Das, West Chester, OH (US); Joseph David Rigney, Milford, OH (US); Jeffrey Allan Pfaendtner, Blue Ash, OH (US); Matthew David Saylor, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 10/685,637

(22) Filed: Oct. 15, 2003

(65) Prior Publication Data

US 2005/0084706 A1 Apr. 21, 2005

(51) Int. Cl.
*C23C 16/00* (2006.01)

(52) U.S. Cl. .................. 427/250; 427/252; 427/253

(58) Field of Classification Search .............. 427/250, 427/252, 253
See application file for complete search history.

(56) References Cited

U.S. PATENT DOCUMENTS

| | | | |
|---|---|---|---|
| 2,886,469 A | 5/1959 | Fitzer | |
| 3,079,276 A | 2/1963 | Puyear et al. | |
| 3,486,927 A | 12/1969 | Gauje | |
| 3,544,348 A | 12/1970 | Boone et al. | |
| 3,978,251 A | 8/1976 | Stetson et al. | |
| 4,004,047 A | 1/1977 | Grisik | |
| 4,132,816 A | 1/1979 | Benden et al. | |
| 4,148,275 A | 4/1979 | Benden et al. | |
| 4,332,843 A | 6/1982 | Ahuja | |
| 4,347,267 A | 8/1982 | Baldi | |
| 4,382,976 A | 5/1983 | Restall | |
| 4,687,684 A | 8/1987 | Restall et al. | |
| 4,714,624 A | 12/1987 | Naik | |
| 4,944,858 A | 7/1990 | Murphy et al. | |
| 5,068,127 A | 11/1991 | Fournes et al. | |
| 5,071,678 A | 12/1991 | Grybowski et al. | |
| 5,217,757 A | 6/1993 | Milaniak et al. | |
| 5,221,354 A | 6/1993 | Rigney | |
| 5,264,245 A | 11/1993 | Punola et al. | |
| 5,368,888 A | 11/1994 | Rigney | |
| 5,407,704 A | 4/1995 | Basta et al. | |
| 5,503,874 A | 4/1996 | Ackerman et al. | |
| 5,674,610 A | 10/1997 | Schaeffer et al. | |
| 5,693,368 A | 12/1997 | Ackerman et al. | |
| 5,780,106 A | 7/1998 | Conner | |
| 5,928,725 A | 7/1999 | Howard et al. | |
| 6,120,843 A | 9/2000 | Pillhoefer et al. | |
| 6,146,696 A * | 11/2000 | Das et al. | 427/253 |
| 6,153,313 A | 11/2000 | Rigney et al. | |
| 6,156,123 A | 12/2000 | Pillhoefer et al. | |

(Continued)

*Primary Examiner*—Bret Chen
(74) *Attorney, Agent, or Firm*—McNees Wallace & Nurick LLC

(57) ABSTRACT

A process for forming diffusion aluminide coatings on an uncoated surface of a substrate, without interdiffusing a sufficient amount of aluminum into a coating layer to adversely affect the coating growth potential and mechanical properties of said coating layer. A metal substrate is provided comprising an external surface and an internal passage therein defined by an internal surface, at least a portion of the external surface of the substrate being coated with a coating layer selected from the group consisting of β-NiAl-base, MCrAlX, a line-of-sight diffusion aluminide, a non-line-of-sight diffusion aluminide, a pack diffusion aluminide, and a slurry diffusion aluminide on said substrate. The metal substrate is subjected to an aluminum vapor phase deposition process.

20 Claims, 4 Drawing Sheets

U.S. PATENT DOCUMENTS

| | | |
|---|---|---|
| 6,207,233 B1 | 3/2001 | Perry et al. |
| 6,224,941 B1 | 5/2001 | Chen et al. |
| 6,255,001 B1 | 7/2001 | Darolia |
| 6,273,678 B1 * | 8/2001 | Darolia ................ 415/200 |
| 6,283,714 B1 | 9/2001 | Rigney et al. |
| 6,291,084 B1 | 9/2001 | Darolia et al. |
| 6,296,447 B1 | 10/2001 | Rigney et al. |
| 6,326,057 B1 | 12/2001 | Das et al. |
| 6,334,907 B1 | 1/2002 | Das et al. |
| 6,339,879 B1 * | 1/2002 | Wheat et al. ........ 29/889.721 |
| 6,434,876 B1 * | 8/2002 | Wheat et al. ............ 427/203 |
| 6,458,473 B1 | 10/2002 | Conner et al. |
| 6,533,875 B1 * | 3/2003 | Pfaendtner et al. ........ 148/535 |
| 6,560,870 B1 * | 5/2003 | Das et al. ................ 29/889.1 |
| 6,607,611 B1 * | 8/2003 | Darolia ................ 148/277 |
| 6,730,179 B1 * | 5/2004 | Kircher ................ 148/240 |
| 6,863,925 B1 * | 3/2005 | Wheat et al. ............ 427/250 |
| 7,056,555 B1 * | 6/2006 | Bauer et al. ............ 427/239 |

\* cited by examiner

METHOD OF SELECTIVE REGION VAPOR PHASE ALUMINIZING

FIELD OF THE INVENTION

The present invention is directed to a method of vapor phase aluminizing. More particularly, this invention relates to applying a vapor phase aluminide coating to bare alloy regions.

BACKGROUND OF THE INVENTION

The operating temperature within a gas turbine engine is both thermally and chemically hostile. Significant advances in high temperature capabilities have been achieved through the development of iron, nickel and cobalt-based superalloys and the use of environmental coatings capable of protecting superalloys from oxidation, hot corrosion, etc., but coating systems continue to be developed to improve the performance of the materials.

In the compressor portion of an aircraft gas turbine engine, atmospheric air is compressed to 10–25 times atmospheric pressure, and adiabatically heated to 800°–1250° F. in the process. This heated and compressed air is directed into a combustor, where it is mixed with fuel. The fuel is ignited, and the combustion process heats the gases to very high temperatures, in excess of 3000° F. (1650° C.). These hot gases pass through the turbine, where airfoils fixed to rotating turbine disks extract energy to drive the fan and compressor of the engine, and the exhaust system, where the gases supply thrust to propel the aircraft. To improve the efficiency of operation of the aircraft engine, combustion temperatures have been raised. Of course, as the combustion temperature is raised, steps must be taken to prevent thermal degradation of the materials forming the flow path for these hot gases of combustion.

Aircraft gas turbine engines have a so-called High Pressure Turbine (HPT) to drive the compressor. The HPT is located immediately aft of the combustor in the engine layout and experiences the highest temperature and pressure levels (nominally ~3000° F. (1850° C.) and 300 psia, respectively) developed in the engine. The HPT also operates at very high rotational speeds (10,000 RPM for large high-bypass turbofans, 50,000 for small helicopter engines). There may be one or two stages of airfoils in the HPT. In order to meet life requirements at these levels of temperature and pressure, HPT components are always air-cooled and are constructed from advanced alloys.

While a straight turbojet engine and a low-bypass turbofan engine will usually have only one turbine (an HPT), most engines today are of the high-bypass turbofan or turboprop type and require one (and sometimes two) additional turbine stage(s) to drive a fan or a gearbox. This stage is called the Low Pressure Turbine (LPT) and immediately follows the HPT in the engine layout. Since substantial pressure drop occurs across the HPT, the LPT operates with a much less energetic fluid and will usually require several stages (usually up to six) to extract as much power as possible.

Components formed from iron, nickel and cobalt-based superalloys cannot withstand long service exposures if located in certain sections of a gas turbine engine, such as the LPT and HPT sections. A common solution is to provide such components with an environmental coating that inhibits oxidation and hot corrosion. Coating materials that have found wide use for this superalloy generally include diffusion aluminide coatings. These coatings are generally formed by such methods as diffusing aluminum deposited by chemical vapor deposition (CVD), slurry coating, pack cementation, above-pack, or vapor (gas) phase aluminide (VPA) deposition into the superalloy.

A diffusion aluminide coating generally has two distinct zones, the outermost of which is an additive layer containing an environmentally resistant intermetallic generally represented by MAl, where M is iron, nickel, cobalt, a noble metal or combinations thereof depending on the substrate material. Beneath the additive layer is a diffusion zone comprising various intermetallic and topologically close packed (TCP) phases that form during the coating reaction as a result of compositional gradient(s) and changes in elemental solubility in the local regions of the substrate. During high temperature exposure in air, a thin protective aluminum oxide (alumina) scale or layer that inhibits oxidation of the diffusion coating and the underlying substrate forms over the additive layer.

Currently, the majority of HPT blades are protected from the environment with PtAl environmental coatings or thermal barrier systems (a bond coat with ceramic top coat). Greater performance is being sought for these systems to increase turbine temperature capability and improve repairability of components. Different coating compositions and processes are required to achieve this capability. However, the new processes being used are limited to line-of-sight regions of the blade. This limitation highlights the need for cost-effective processes to apply coatings in the non line-of-sight areas of the components getting these new overlay coatings.

Recently, high Al, primarily beta phase nickel aluminum (β-NiAl) based coatings, which contain additions of chromium (Cr) and reactive elements such as zirconium (Zr), hafnium (Hf), and yttrium (Y), have been developed to serve as bond coatings for thermal barrier coatings for gas turbine engine components. Such high Al, primarily beta phase nickel aluminum (β-NiAl) based coatings are disclosed in U.S. Pat. No. 6,153,313, issued Nov. 28, 2000; U.S. Pat. No. 6,255,001 B1, issued Jul. 3, 2001; U.S. Pat. No. 6,291,084 B1, issued Sep. 18, 2001, which are assigned to General Electric Company, the assignee of the present invention, and which are hereby incorporated by reference. Unfortunately, due to the nature of the processes used to apply these β-NiAl-base coatings, the bond coatings cannot be applied to the interior cooling passageways of components that use film cooling, nor can the processes be used to coat exterior portions of the components that are shadowed due the complex geometry of such components. If standard chemical vapor deposition or vapor phase aluminization processes are used to coat the interior cooling passageways and/or the exterior shadowed surfaces of the components, then excess aluminum is deposited into the β-NiAl coatings. The rate at which a diffusion aluminide coating develops on a substrate is dependent in part on the substrate material, the amount and type of donor material, the amount and type of activator used and the temperature of the aluminization process.

Without the deposition of a diffusion aluminide coating into the sections of the component that cannot be coated with the β-NiAl-base coatings, the operable life of the component will be severely limited. However, excess aluminization adversely affects the performance of the β-NiAl-base layers.

What is needed is a modified chemical vapor deposition (CVD), vapor phase aluminiding (VPA), or above the pack aluminization process that will aluminide the desired bare regions of the airfoil (internal and external), but that will not substantially affect the surface chemistry of the pre-deposited coatings. The present invention provides an aluminization process with novel process parameters for aluminizing non-line-of-sight regions of components that have primarily β-NiAl coatings, or other aluminide coatings, already applied.

SUMMARY OF THE INVENTION

The present invention provides an aluminization process with a novel aluminum atmosphere that permits the aluminization of the surface of non-line-of-sight regions and/or line-of-sight regions of superalloy substrates that already have a primarily β-NiAl base coating, a coating generally represented by an MCrAlX coating, where M a metal selected from the group consisting of iron, nickel, cobalt, and combinations thereof and where X is a material selected from the group consisting of yttrium, zirconium, hafnium, rare earth elements, and combinations thereof, a line of sight diffusion aluminide coating comprising aluminum, optionally chromium, and optionally a reactive element, selected from the group consisting of hafnium, yttrium, zirconium, and/or a noble metal selected from the group consisting of platinum, rhodium, palladium, and combinations thereof, or a pack diffusion alumide coating, such as slurry processes, and tape processes, comprising aluminum, optionally chromium, and optionally a reactive element selected from the group consisting of hafnium, yttrium, zirconium, and combinations thereof and/or a noble metal selected from the group consisting of platinum, rhodium, palladium, and combinations thereof for use in high temperature applications, but where at least a portion of the non-line-of-sight regions and/or line-of-sight regions are bare uncoated substrate. The aluminization process of the present invention develops diffusion aluminde coatings on uncoated, exposed portions of the substrate (i.e. bare substrate), but does not deposit excess aluminum onto the β-NiAl base coating layer such that the performance of the β-NiAl base coating layer is adversely affected. The present invention deposits and diffuses aluminum into the β-NiAl base coating layer such that the weight percent aluminum at any depth in the β-NiAl base coating layer is in the range of about 22 weight percent aluminum to about 30 weight percent aluminum. Coating growth potential and mechanical properties of the β-NiAl base coating layer are degraded if the percentage of aluminum in the layer rise above about 30 weight percent aluminum at any point in the layer. Certain donor materials and activators in combination with a range of process parameters are necessary to achieve the benefits of this invention. More particularly, the process of this invention entails placing one or more substrates in a chamber that contains an aluminum containing donor material and a halide activator.

The aluminum atmosphere is produced using a donor material of aluminum, for example, aluminum, a chromium-aluminum alloy, a cobalt-aluminum alloy, an iron-aluminum alloy, a titanium-aluminum alloy or any combinations thereof. The aluminization process uses a halide activator, which may include many of the halide activators known to the art, including $AlF_3$, $AlCl_3$, $AlBr_3$, $AlI_3$, $NH_4F$, $NH_4Cl$, $NH_4Br$, $NH_4I$, $CrF_3$, $CrCl_3$, $CrBr_3$, and $CrI_3$, and combinations thereof, among others. The operable transport gases are hydrogen, argon, nitrogen, and combinations thereof.

The concentration of the halide activator in grams of activator per cubic foot of transport gas flow per hour is kept within a preselected range, which range depends on the temperature of the process and the length of time of the process. The temperature of the process is preselected from a temperature in the range of about 1350° F. (730° C.) to about 1925° F. (1050° C.). Regardless of the range, the concentration of halide activator is not below about 1 $g/ft^3/hr$ or above about 5 $g/ft^3/hr$. The transport gas has a flow rate in the range of about 20 $ft^3/hr$ to about 120 $ft^3/hr$. The substrate is aluminized for about 2 hours to about 10 hours at a temperature in the range of about 1350° F. (730° C.) to about 1925° F. (1050° C.).

According to this invention, these process parameters create an aluminum atmosphere that develops diffusion aluminde coatings on the bare portions of the substrate, without adding a substantial amount of additional undesired aluminum to the β-NiAl-base layer. As a result, gas turbine components such as high pressure turbine components comprising iron, nickel, and cobalt-based (and combinations thereof) superalloys can be initially coated with a β-NiAl layer, using conventional methods for depositing β-NiAl, and then internally coated with a diffusion aluminide coating without adversely affecting the β-NiAl layer.

The present invention is also a superalloy article comprising a substrate, with the substrate comprising an external surface and an internal passage therein defined by a internal surface where both the internal surface and the external surface were low in aluminum content immediately after initial manufacture of the superalloy article. A first aluminum-rich layer is present on the external surface. The first aluminum-rich layer was applied to the external surface after initial manufacture and made the external surface aluminum-rich and formed an aluminum-rich surface on the external surface, while the internal surface remained low in aluminum content after the application of the aluminum-rich layer to the external surface. A second aluminum-rich layer is present on the internal surface. The second aluminum-rich layer was applied to the external surface after the application of the first aluminum-rich layer. The second aluminum-rich layer was applied by exposing both the external surface and the internal surface to an aluminum-rich atmosphere, where such exposure deposited aluminum onto and diffused aluminum into the internal surface without the already aluminum-rich first external surface undergoing a phase change and without depositing sufficient aluminum onto and sufficient aluminum into the external surface to adversely affect the coating growth potential and mechanical properties of the first aluminum-rich layer.

The present invention is also a turbine engine component comprising a superalloy substrate, which comprises a surface, the surface having been low in aluminum content immediately after initial manufacture of the superalloy article. The component also comprises a first aluminum-rich layer being present on a first portion of the surface, the first aluminum-rich layer having been applied to the first portion of the surface after initial manufacture, the first aluminum-rich layer making the first portion of the surface aluminum-rich and forming an aluminum-rich surface on the first portion of the surface, with a second portion of the surface remaining low in aluminum content after the application of the aluminum-rich layer to the first portion of the surface. In addition the component also comprises a second aluminum-rich layer being present on a second portion of the surface, the second aluminum-rich layer having been applied to the second portion of the surface after the application of the first aluminum-rich layer, the second aluminum-rich layer having been applied by exposing both the first portion of the surface and the second portion of the surface to an aluminum-rich atmosphere, such exposure depositing aluminum onto and diffusing aluminum into the second portion of the surface without the already aluminum-rich first portion of the surface undergoing a phase change and without depositing sufficient aluminum onto and sufficient aluminum into the first portion of the surface to adversely affect the coating growth potential and mechanical properties of the first aluminum-rich layer. The turbine engine component may be a turbine vane, a turbine blade, a deflector, a centerbody, a shroud, or a splash plate.

An advantage of the present invention is the ability to protect regions of HPT blades with β-NiAl alloy coatings applied by line-of-sight processes such as high velocity oxy-fuel (HVOF), electron beam, physical vapor deposition (EB-PVD), ion plasma deposition, or other line-of-sight processes and regions out of the line-of-sight with a diffusion aluminide, without adversely affecting the β-NiAl alloy.

Another advantage of the present invention is that the β-NiAl alloy layer of the bond coat or environmental coating can withstand higher temperatures as compared to prior art bond coats or environmental coatings. Another advantage of the present invention is lower costs associated with this process than with the current practice of slurry coating the non-line-of-sight portions of the superalloy components.

Another advantage of the method of the present invention is that the outer layer of the diffusion aluminide bond coating is high in aluminum, providing an aluminum source for the formation and regeneration of an alumina scale.

Another advantage of the present invention is that the β-NiAl alloy layer, which has superior environmental properties, can be applied to preselected portions of the hot section of a superalloy component by a line-of-sight process, while the remainder of the superalloy component subsequently can be provided with the non-line of sight diffusion aluminide coating of the present invention without adversely affecting the β-NiAl alloy.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
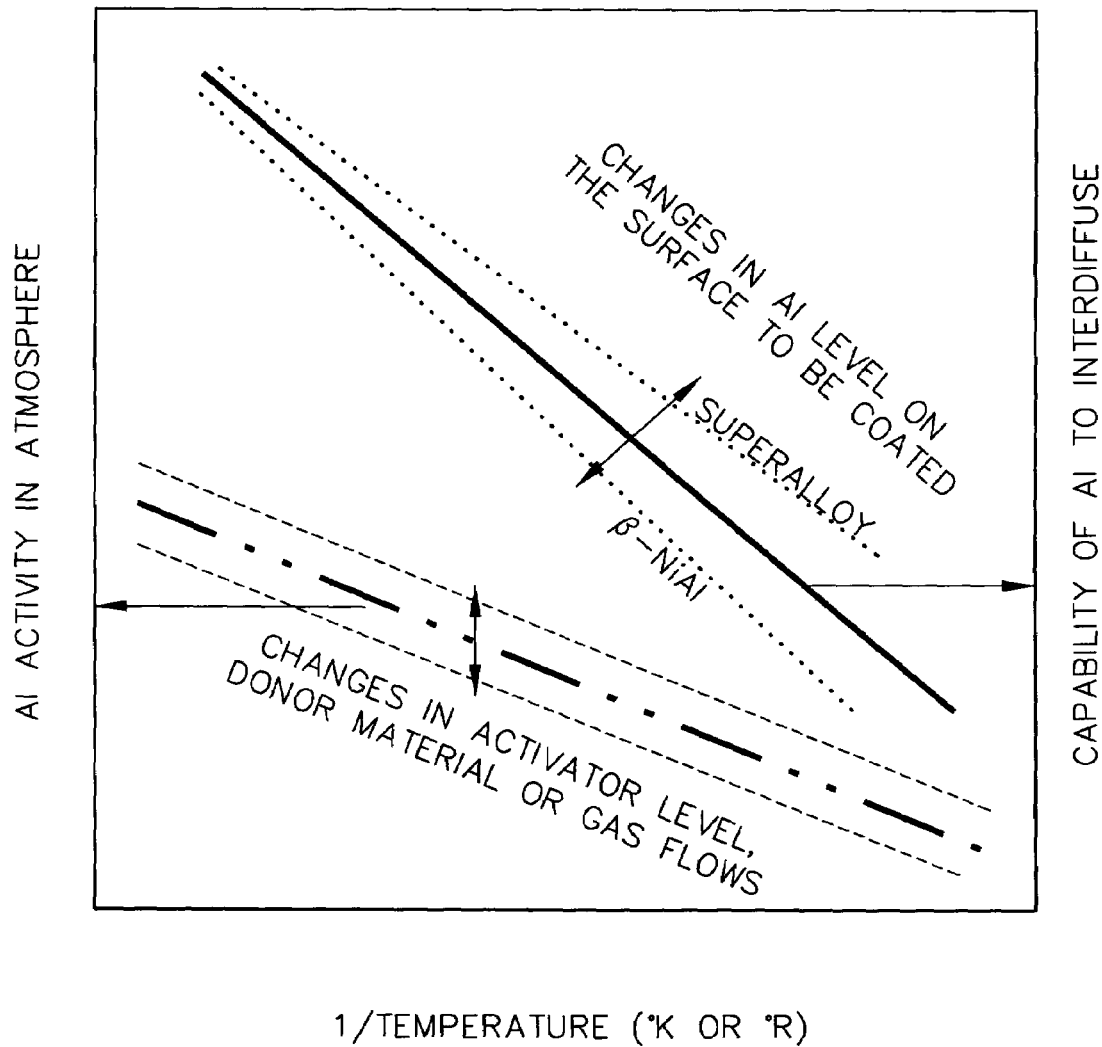
FIG. 1 is a general graph illustrating the aluminum activity in the atmosphere and the capability of Al to interdiffuse in relationship to the inverse of the temperature.

The present invention is generally directed to the aluminization of superalloy components that have bare substrate non-line-of-sight and/or line-of-sight regions, with other regions that have been coated with a β-NiAl alloy layer, a bond coat generally represented by an MCrAlX coating, where M a metal selected from the group consisting of iron, nickel, cobalt, and combinations thereof and where X is a material selected from the group consisting of yttrium, zirconium, hafnium, another rare earth element, and combinations thereof, a non-line-of-sight diffusion aluminide coating comprising aluminum, optionally chromium, and optionally a noble metal selected from the group consisting of platinum, rhodium, palladium, and combinations thereof and/or a reactive element selected from the group consisting of hafnium, yttrium, zirconium and combinations thereof, a line-of-sight diffusion aluminide coating comprising aluminum, optionally chromium, and optionally a noble metal selected from the group consisting of platinum, rhodium, palladium, and combinations thereof and/or a reactive element selected from the group consisting of hafnium, yttrium, zirconium and combinations thereof, or a pack diffusion alumide coating, such as slurry processes, and tape processes, comprising aluminum chromium and a noble metal selected from the group consisting of hafnium, yttrium, zirconium and/or a reactive element selected from the group consisting of hafnium, yttrium, zirconium, and combinations thereof. These processes do not use flowing gases for the purpose of reacting with the component. While developed for gas turbine engine components, and particularly high pressure turbine airfoils comprising nickel-base superalloys, the teachings of this invention are generally applicable to any situation in which it is desired to aluminize uncoated line-of-sight regions and/or non-line-of-sight regions in cobalt, nickel, and iron-base superalloys (and combinations thereof) even though portions of the component have been coated with a coating utilizing a line-of-sight and/or non-line-of-sight process.

The present invention is an aluminization process whose process materials and parameters have been found to develop diffusion aluminide coatings on the uncoated regions of a gas turbine component, such as line-of-sight regions and/or non-line-of-sight regions, without depositing excess aluminum onto regions of the component that have previously been coated with a β-NiAl-base layer. The present invention utilizes chemical vapor deposition (CVD) processes, vapor phase aluminization (VPA) and above-the-pack aluminization processes. VPA is the preferred process for the present invention. Accordingly, this invention overcomes the principle obstacle to aluminizing the bare regions of a component where at least a portion of the line-of-sight regions and/or non-line-of-sight regions have already been coated such as with a β-NiAl base coating. As the line-of-sight and/or non-line-of-sight coating, such as the β-NiAl additive layer, either has to be applied at temperatures which are sufficiently high enough to cause diffusion of the constituent elements of the applied coating layer or is subjected to a diffusion heat treatment prior to the aluminization process of the present invention, some of the applied coating layer, such as a β-NiAl layer, is interdiffused into the underlying substrate. Therefore, the β-NiAl coating layer is not entirely β-NiAl, but rather has a diffusion zone under the β-NiAl layer. However, as referred to herein, "β-NiAl base" refers to the entire bond coat layer created when β-NiAl base alloy is applied to the substrate (and possibly diffusion heat treated), optionally including other elements substitutionally present in the various phase NiAl matrices, such other elements being selected from the group consisting of Cr, Zr, Hf, Y, and combinations thereof. The aluminization process of the present invention deposits and diffuses an insignificant amount of aluminum onto the β-NiAl base layer. The thermal performance of the β-NiAl base layer is not adversely affected by the diffusion of this small amount of aluminum into the β-NiAl base layer.

While various aluminum-containing donor materials can be used for the aluminization process of the present invention, aluminum, chromium-aluminum alloys, cobalt-aluminum alloys, iron-aluminum alloys and combinations thereof are preferred to provide a vapor phase of aluminum. Sufficient aluminum donor material is provided to saturate the aluminization atmosphere with Al, as is known in the art. In a more preferred embodiment, the aluminum-containing donor materials are a chromium-aluminum alloy that is about 70 weight percent chromium and about 30 weight percent aluminum, a cobalt aluminum alloy that is about 50 weight percent cobalt and 50 weight percent aluminum, an iron-aluminum alloy that is about 40 weight percent iron and about 60 weight percent aluminum, a titanium-aluminum alloy that is about 50 weight percent titanium and about 50 weight percent aluminum. In the most preferred embodiment, the aluminum-containing donor material is a chromium-aluminum alloy that is about 70 weight percent chromium and 30 weight percent aluminum. The amount of aluminum donor material provided for the process of the present invention is sufficient to saturate a transport gas and a halide activator gas with aluminum.

While various halide activators creating the aluminum activity required by the present invention could forseeably be used, the preferred halide activators are $AlF_3$, $AlCl_3$, $AlBr_3$, $AlI_3$, $NH_4F$, $NH_4Cl$, $NH_4Br$, $NH_4I$, $CrF_3$, $CrCl_3$, $CrBr_3$, and $CrI_3$. The more preferred halide activators are $AlF_3$, $AlCl_3$, $NH_4F$, $NH_4Cl$, $CrF_3$, and $CrCl_3$. The most preferred halide activator for the aluminization process of the present invention is $AlF_3$. The concentration of the $AlF_3$ activator required to produce the aluminum atmosphere required by the present invention is in the range of about 1 g of $AlF_3$ per $ft^3$/hr of transport gas to about 5 g of $AlF_3$ per $ft^3$/hr of transport gas. In a preferred embodiment, the aluminum atmosphere requires about 1 g of $AlF_3$ per $ft^3$/hr of transport gas flow. When other fluorine halide activators are used, the number of moles of fluorine should be the same as the moles of fluorine used for the $AlF_3$ activator concentration. If $CrF_3$ is used as the halide activator, the concentration of the $CrF_3$ activator required to produce the aluminum atmosphere of the present invention is about 1.29 g of $CrF_3$ per $ft^3$/hr of transport gas to about 6.48 g of $CrF_3$ per $ft^3$/hr of transport gas. In a preferred embodiment, the aluminum atmosphere requires about 1.29 g of $CrF_3$ per $ft^3$/hr of transport gas flow. If $NH_4F$ is used as the halide activator, the concentration of the $CrF_3$ activator required to produce the aluminum atmosphere of the present invention is about 0.44 g of $NH_4F$ per $ft^3$/hr of transport gas to about 2.21 g of $NH_4F$ per $ft^3$/hr of transport gas. In a preferred embodiment, the aluminum atmosphere requires about 1.29 g of $NH_4F$ per $ft^3$/hr of transport gas flow. In the case of fluorine containing halide activators, the important factor is the number of moles of F per $ft^3$/hr of transport gas flow. For all fluorine-containing halide activators, the number of moles of F per $ft^3$/hr of transport gas flow should range from about 0.036 moles per $ft^3$/hr of transport gas flow to about 0.18 moles per $ft^3$/hr of transport gas flow.

While various vapor transport gases known in the art can be used in the diffusion aluminization process of the present invention, including hydrogen, helium, argon, nitrogen, other inert gases, and combinations thereof, the preferred transport gases are hydrogen, argon, and combinations thereof. The most preferred transport gas is hydrogen. The aluminization process is run for a period of time in the range of about 2 hours to about 10 hours depending on the temperature at which the aluminization process is run with higher temperatures requiring shorter times. In a preferred embodiment, the aluminization process is run for a period of time in the range of about 2 hours to about 10 hours. In a most preferred embodiment, the aluminization process is run for a period of about 6 hours. The aluminization process of the present invention is run at a preselected temperature in the range of about 1350° F. (730° C.) to about 1925° F. (1050° C.).

Without wishing to be bound by theory, it is believed that the actual amount of activator is probably irrelevant, as long as sufficient aluminum is produced to allow the aluminum content of the surface of the superalloy to increase over time. The driving forces for the diffusion and deposition of Al are governed by Gibb's Free Energy considerations, which drive the deposition, and Fick's Second Law of Diffusion, which sets forth the relationship for the diffusion of the deposited Al into the substrate surfaces. As set forth in Fick's Second Law of Diffusion, where C is the concentration of atoms in a material in number of atoms/$cm^3$, D is the diffusion coefficient in $cm^2$/sec, x is the depth of diffusion in cm, and t is the time in seconds, the time rate of concentration change, $\Delta C/\Delta t$, is related to the second derivative of the concentration gradient through the diffusion coefficient as set forth in Equation 1 below, assuming that the diffusion coefficient D is independent of concentration and applies to a one-dimensional gradient.

$$\Delta C/\Delta t = D(\Delta^2 C/\Delta x^2) \qquad \text{Equation 1}$$

The diffusion aluminization process of the present invention is governed by Fick's Law of Diffusion, which is exponentially related to temperature as set forth in Equation 2 below.

$$x = Dt^{1/2} \qquad \text{Equation 2}$$

The value of D can be calculated by an equation that utilizes two constants, namely $D_0$, a constant having the units of $cm^2$/sec and Q, the activation energy, which is derived, in part, from Gibbs Free Energy considerations, having the units of cal/mol, with T representing the temperature in ° K, and R the universal gas constant, as set forth below in Equation 3.

$$D = D_0 \exp(-Q/RT) \qquad \text{Equation 3}$$

From Equation 3, it can be seen that the value of D is temperature dependent. The smaller the value of D, the smaller the depth of diffusion over the same length of time for various solutes. The value of $D_0$ for Al is greater in superalloys than $D_0$ for Al in NiAl alloys and is not temperature dependent. However, unlike $D_0$, D is different for the same alloy at different temperatures. The activation energy Q, is also material dependent and drives the temperature dependency. Q for the β-NiAl/Al is much greater than that for the superalloy/Al interaction.

The ability of a diffusion coating process to create a coating of a certain thickness from Al concentration on the surface of a superalloy component depends on a number of factors, including the Al activity in the transport gas, the reactivity of the surface (how much Al can be accepted, a function of the equilibrium concentration at the process temperature), and the ability for Al to diffuse into the base metal (how far it can diffuse away, which in turn affects reactivity). As shown in general form in FIG. 1, two of these factors, namely aluminum activity in the atmosphere and the ability of aluminum to interdiffuse are shown as a process of inverse absolute process temperature. The lines in the figure are to illustrate the theory of the relative diffusion of the Al into β-NiAl alloy and are not meant as an actual plot of data points. Plotting the graph in FIG. 1 in such a manner provides an illustration of the activation energy for the process. At any one temperature, the Al activity in the gas is driven by activator level, donor material type and gas flow.

With a set donor material, gas flow and activator content are considered minor to the effects of process temperature, meaning that increases in process temperature increase the activity of Al in the vapor more than the typical range of gas flow and activator content would. In FIG. 1, the slope of the upper sets of lines that correspond to the capability of the Al to interdiffuse into the substrate or β-NiAl is the value of −Q/RT.

Under any set of conditions establishing a fixed Al activity in the atmosphere, the surface of the component to be coated with a diffusion aluminide coating may accept Al if the equilibrium activity had not yet been achieved. At higher temperatures where the process generally has higher Al activity in the gas, Al can be readily deposited onto a surface. The temperature is high enough that the Al can easily interdiffuse into the base alloy. The schematic shows that changes in process temperature affects the interdiffusion more than typical changes affect process activity. Due to the greater diffusion rate at higher temperatures, the resulting coating Al levels on a bare superalloy are comparatively low. When Al is deposited at lower temperatures, which means that there is a lower Al activity in the atmosphere, low diffusion rates result in high Al concentrations in the coating applied to a bare superalloy. With a given temperature and Al activity in the atmosphere, the resulting coating composition and thickness will not change significantly with time. Achieving the desired levels of coating thickness and coating Al concentration requires a balanced level of process Al activity in the atmosphere and substrate temperature to drive interdiffusion.

Based on such understanding of the process by which a diffusion aluminide coating forms, the expected way to produce the desired coating system, which is a diffusion aluminide coating of the internal elements of the component, but with little interaction with the coating overlay, such as a β-NiAl coating, on external portions of the component, a higher temperature process would presumably be more effective than a lower temperature process. However, the present invention has established that this is not the case in the experiments leading up to this invention as set forth below, which showed the opposite results. Aluminiding a component having a coating, such as a β-NiAl coating, at high temperature led to significantly higher Al levels in the coating, potentially due to sufficient interdiffusion, as compared to that found with bare alloy substrate. At lower temperatures, Al deposition and diffusion were inhibited, resulting in low Al pick-up on the coating.

Substantial interaction of the diffusion aluminide with the β-NiAl can be avoided, and other superalloy locations can be coated by selecting a process temperature at which diffusion is inhibited in the β-NiAl. Any Al activity in the atmosphere when the process is held where diffusion rates into the coating are low is considered operable. Without wishing to be bound by theory, it is believed that the upper temperature limit is likely to be about 1925° F. (1050° C.). As set forth in the experimental results below, 1900° F. (1040° C.) was shown to be effective, while 1975° F. (1080° C.) was shown to be ineffective.

Figure 2:
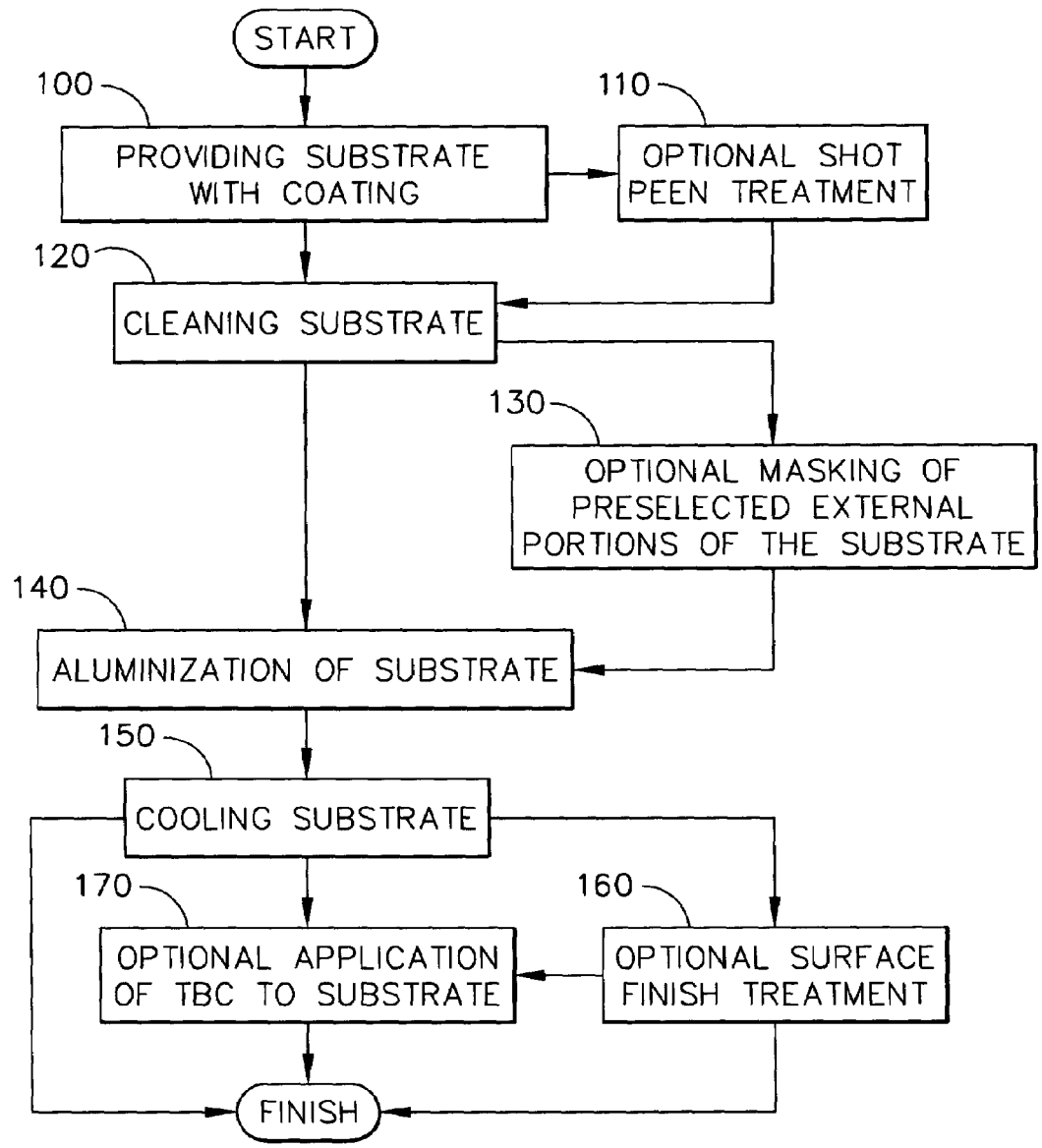
FIG. 2 is a process flow chart illustrating the VPA process of the present invention.

Referring now to FIG. 2 there is shown the method of the present invention for applying an aluminide coating to a substrate having an internal passage therein defined by an internal surface, and an external surface, which has already been coated with a β-NiAl base bond coat layer. This is best exemplified as a cooling hole or channel in a gas turbine component. The initial step of the process 100 is the provision of a substrate having an internal passage therein defined by an internal surface, and an external surface, and having at least a portion of the external surface coated with a layer of coating selected from the group consisting of a β-NiAl base layer, a bond coat generally represented by an MCrAlX coating, where M a metal selected from the group consisting of iron, nickel, cobalt, and combinations thereof and where X is a material selected from the group consisting of yttrium, zirconium, hafnium, another rare earth element, and combinations thereof, a line of sight diffusion aluminide coating comprising aluminum, optionally chromium and optionally a noble metal selected from the group consisting of platinum, rhodium, palladium, and combinations thereof and/or a reactive element selected from the group consisting of hafnium, yttrium, zirconium, and combinations thereof, but do not use flowing gases for the purpose of reacting with the component, or a pack diffusion alumide coating, such as slurry processes and tape processes, comprising aluminum, optionally chromium, and optionally a noble metal selected from the group consisting of platinum, rhodium, palladium, and combinations thereof and/or a reactive element selected from the group consisting of hafnium, yttrium, zirconium, and combinations thereof. In a preferred embodiment, at least a portion of the external surface coated with a β-NiAl base layer, and wherein the β-NiAl base layer was previously applied using a line-of-sight process and/or non-line-of-sight process, such as high velocity oxy-fuel process (HVOF), electron beam physical vapor deposition (EV-PVD) or ion plasma processes. In a more preferred embodiment, the substrate has an internal passage therein defined by an internal airfoil surface, and an external airfoil surface, at least a portion of which includes a coating such as a β-NiAl layer. In a more preferred embodiment, the coating is a β-NiAl layer that also comprises a component selected from the group consisting of chromium, zirconium, hafnium, yttrium, silicon, platinum, palladium, rhodium and combinations thereof. In a more preferred embodiment, the substrate is a gas turbine engine component having an internal passage therein defined by an internal cooling passage, and an external surface, at least a portion of which includes a β-NiAl layer, which was applied using β-NiAlCrZr alloy particles comprising a weight percentage of nickel in the range of about 53.5 weight percent to about 64.5 weight percent, a weight percentage of aluminum in the range of about 20 weight percent to about 30 weight percent, a weight percentage of chromium in the range of about 2 weight percent to about 15 weight percent, and a weight percentage of zirconium in the range of about 0.5 weight percent to about 1.5 weight percent zirconium. In a most preferred embodiment, the β-NiAl base alloy coating was applied with a HVOF process using β-NiAl base alloy particles comprising about 60 weight percent nickel, about 27 weight percent aluminum, about 12 weight percent chromium and about 1 weight percent zirconium. The optional next step of the process 110 is a shot peen treatment to densify and smooth the coating in preselected component regions as required. Shot peen treatments for densification and smoothing are well-known in the art. The next step of the process 120 is cleaning the substrate to remove any dirt or other particles contaminating the external surface of the component or coating layer. The optional next step 130 of the process is masking, with an alumina powder or other effective maskant, any preselected external portions of the substrate that would be adversely affected by an aluminide coating.

The next step 140 of the process is the aluminization of the substrate using an aluminum donor material source selected from the group consisting of aluminum, a titanium-aluminum alloy, chromium-aluminum alloy, cobalt-aluminum alloy iron-aluminum alloy donor, and combinations thereof, a halide activator, and a vapor transport gas selected from the group consisting of hydrogen, argon, and combinations thereof. The aluminization may be performed using a CVD process, a VPA process, or an above the pack deposition process. The aluminization process is run at a temperature in the range of about 1350° F. (730° C.) to about 1925° F. (1050° C.). The aluminization process is run for a time in the range of about 2 hours to about 10 hours depending on the temperature of the process. Sufficient aluminum donor material is provided to saturate the aluminization atmosphere, as is known in the art. As the aluminization process is run at a relatively low temperature, very little aluminum is diffused into the β-NiAl-base layer. The concentration of the $AlF_3$ activator required to produce the aluminum atmosphere required by the present invention is in the range of about 1 g of $AlF_3$ per ft$^3$/hr of transport gas to about 5 g of $AlF_3$ per ft$^3$/hr of transport gas. In a preferred embodiment, the aluminum atmosphere requires about 1 g of $AlF_3$ per ft$^3$/hr of transport gas flow. When other fluorine halide activators are used, the number of moles of fluorine should be the same as the moles of fluorine used for the $AlF_3$ activator concentration. If $CrF_3$ is used as the halide activator, the concentration of the $CrF_3$ activator required to produce the aluminum atmosphere of the present invention is about 1.29 g of $CrF_3$ per ft$^3$/hr of transport gas to about 6.48 g of $CrF_3$ per ft$^3$/hr of transport gas. In a preferred embodiment, the aluminum atmosphere requires about 1.29 g of $CrF_3$ per ft$^3$/hr of transport gas flow. If $NH_4F$ is used as the halide activator, the concentration of the $CrF_3$ activator required to produce the aluminum atmosphere of the present invention is about 0.44 g of $NH_4F$ per ft$^3$/hr of transport gas to about 2.21 g of $NH_4F$ per ft$^3$/hr of transport gas. In a preferred embodiment, the aluminum atmosphere requires about 1.29 g of $NH_4F$ per ft$^3$/hr of transport gas flow. In the case of fluorine containing halide activators, the important factor is the number of moles of fluorine per ft$^3$/hr of transport gas flow. For all fluorine-containing halide activators, the number of moles of fluorine per ft$^3$/hr of transport gas flow should range from about 0.036 moles per ft$^3$/hr of transport gas flow to about 0.18 moles per ft$^3$/hr of transport gas flow. The transport gas preferably has a flow rate in the range of about 20 ft$^3$/hr to about 120 ft$^3$/hr. The resulting diffusion aluminide layer formed on the bare portions of the substrate is about 0.0005 inch to about 0.003 inch thick. A small amount of aluminum is interdiffused into the β-NiAl-base layer, however the β-NiAl-base layer is not over-aluminided to the point where the oxidation resistance properties of the β-NiAl-base layer are adversely affected by the aluminization.

In a more preferred embodiment the aluminum donor aluminum alloy material is a chromium-aluminum alloy that is about 70 weight percent chromium and 30 weight percent aluminum, the halide activator is $AlF_3$, and the transport gas is argon. In a more preferred embodiment, the aluminization process is run at a temperature of about 1900° F. (1040° C.) for a time of about 6 hours. The $AlF_3$ is provided to the process at a rate of about 1 g per ft$^3$/hr of argon and the argon is provided at a rate of about 20 ft$^3$/hr. The resulting diffusion aluminide layer formed on the bare portions of the substrate is about 0.017 inch thick. A small amount of aluminum is interdiffused into the β-NiAl-base layer, however the β-NiAl-base layer is not over-aluminided to the point where the oxidation resistance properties of the β-NiAl-base layer is adversely affected by the aluminization. In a more preferred embodiment, the aluminization process of the present invention increases the weight percent of aluminum at the surface of the β-NiAlCrZr layer to about 27 weight percent from an original aluminum weight percent in the range of about 25 weight percent to about 26 weight percent. The increase in the aluminum weight percent to about 27 weight percent does not affect the mechanical and diffusion properties of the resulting coating.

The next, and possibly final, step of the process 150 is cooling the substrate to ambient temperature. The optional next, and possibly final, step of the process 160 is subjecting the coating layer to a surface finish treatment operation to reduce the roughness of the coating surface. Such surface treatments include any functional surface treatments as known in the art. For example, such a surface treatment could include a tumbling process alone or a shot peen process that is followed by a tumbling process. In a preferred embodiment, the surface finish of the coating surface is reduced to less than about 80 microinches. In a more preferred embodiment, the surface finish of the coating surface is reduced to less than about 30 microinches. Such a reduction in the roughness of the surface finish improves the aerodynamic efficiency of an aircraft engine component that does not have a thermal barrier coating ("TBC") applied. Such a reduction in the roughness of the surface finish improves the durability of the TBC on aircraft engine components that have TBC layers applied. The next optional, and possibly final, step of the process 170 is the application of a TBC layer to the exterior surface of the coating layer, which will include oxidation of the substrate as is known in the art.

Figure 3:
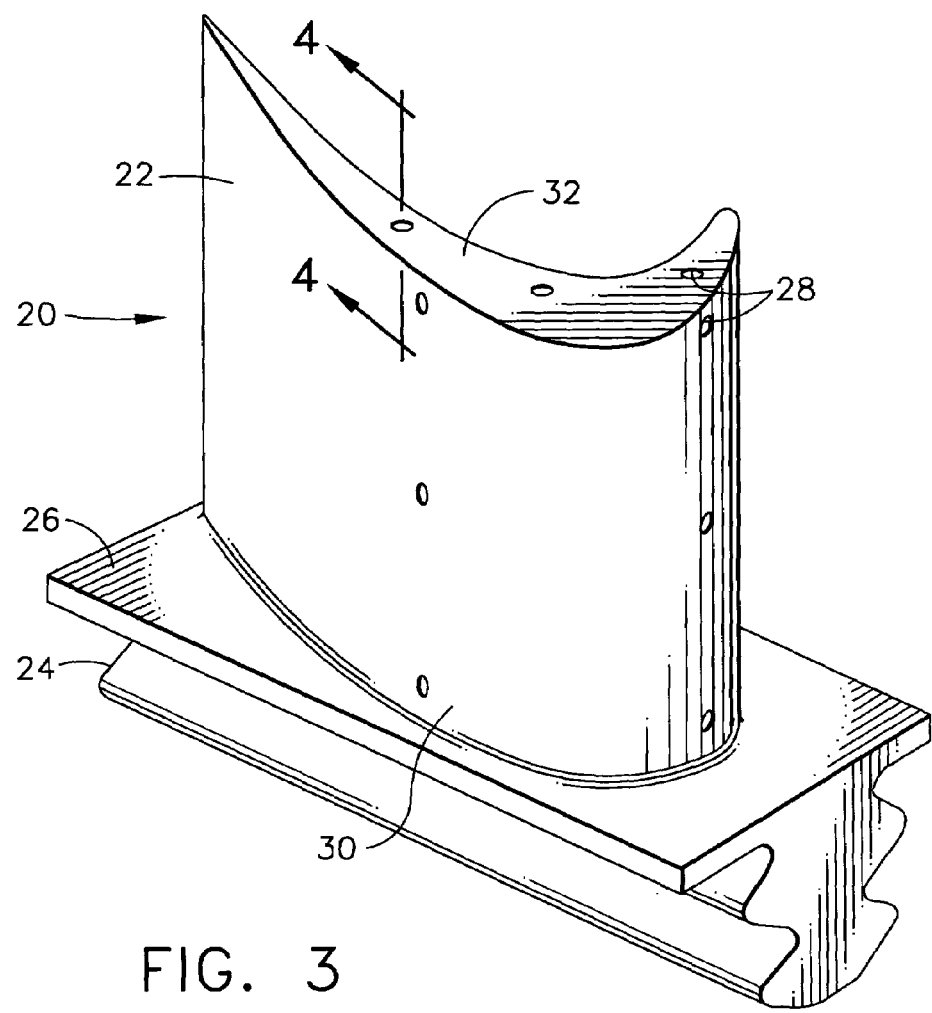
FIG. 3 is a perspective view of a typical turbine blade.

FIG. 3 depicts a component article of a gas turbine engine such as a turbine blade or turbine vane, and in this illustration a turbine blade 20 coated with the β-NiAlCrZr layer, diffusion aluminide layer, and TBC layer prepared with the process of the present invention. The turbine blade 20 is formed of any operable material, and is preferably an iron, nickel or cobalt-base superalloy (or combinations thereof). The turbine blade 20 includes an airfoil 22 against which the flow of hot exhaust gas is directed. The turbine blade 20 is mounted to a turbine disk (not shown) by a dovetail 24 that extends downwardly from the airfoil 22 and engages a slot on the turbine disk. A platform 26 extends longitudinally outward from the area where the airfoil 22 is joined to the dovetail. A number of internal cooling passages extend through the interior of the airfoil 22, ending in openings 28 in the surface of the airfoil 22. A flow of cooling air is directed through the internal cooling passages, to reduce the temperature of the airfoil 22. The airfoil may be described as having a root end 30 adjacent to the dovetail 24, and an oppositely disposed tip end 32 remote from the dovetail 24.

Figure 4:
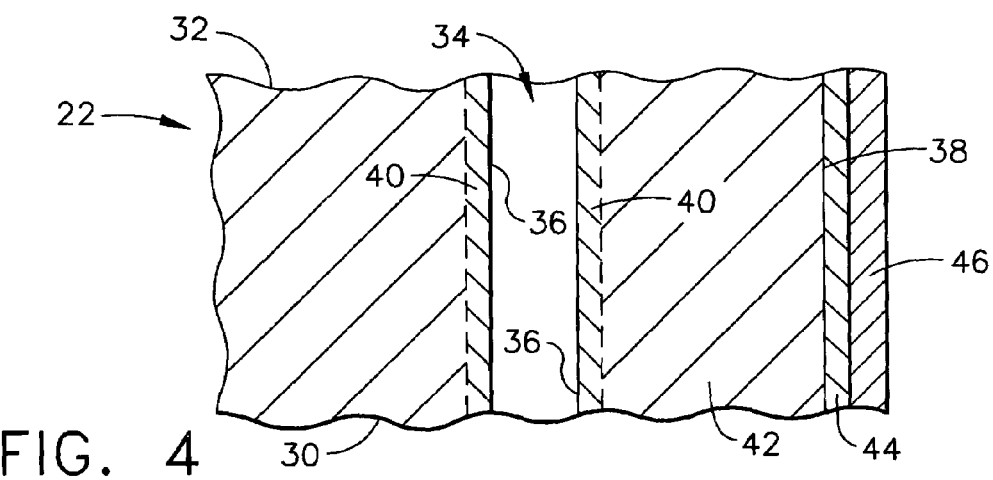
FIG. 4 is a cross-sectional view of a the turbine blade of FIG. 3 through a cooling channel with a β-NiAlCrZr layer applied to the outer surface and a diffusion aluminide coating applied to the inner surface using the method of the present invention.

FIG. 4 is a longitudinal section through the airfoil 22, showing one of the internal cooling passages 34 extending through an interior of the airfoil 22. The internal cooling passage 34 has an internal surface 36. An external airfoil surface 38 of the metallic portion of the airfoil 22 is also shown.

A diffusion aluminide protective layer 40 is formed on the internal airfoil surface 36. The diffusion aluminide is formed by diffusing aluminum into the passageways where it deposits onto the substrate material 42 of the airfoil 22. The aluminum is interdiffused with the material of the substrate 42 to form the aluminum-enriched protective layer 40 lying below the internal airfoil surface 36. The diffusion aluminide protective layer 40 has a composition with the aluminum concentration highest near the internal airfoil surface 36, and decreasing aluminum concentration with increasing distance into the substrate 42 from the internal airfoil surface 36. The diffusion aluminide protective layer 40 is typically from about 0.0005 inch to about 0.003 inch thick. When exposed to a high-temperature oxidizing environment, the aluminum-enriched layer at the internal airfoil surface 36 oxidizes to form a thin highly adherent alumina protective scale (not shown) at the internal airfoil surface 36, inhibiting and slowing further oxidation damage. The aluminum-enriched layer serves as a reservoir to heal any loss of aluminum during normal operation. A bond coat, such as discussed next and applied to the external airfoil (substrate) surface 38 is not used and has not been applied on the internal airfoil surface 36.

A bond coat 44, which preferably is primarily a β-NiAlCrZr layer, from about 0.0005 to about 0.005 inch thick, overlies and contacts the external airfoil surface 38. Such bond coats 44 are generally known in the art, although specific compositions may not be known. When exposed to a high-temperature oxidizing environment, the surface the bond coat 44 oxidizes to form a highly adherent alumina protective scale (not shown) at the external surface of the bond coat 44, inhibiting and slowing further oxidation damage. A TBC 46 is optionally deposited on top of bond coat 44 to provide additional thermal protection for the airfoil 22.

During an investigation leading to this invention, a test using Rene N5 pin samples was completed evaluating lower and higher activity over-aluminiding with various NiAl chemistries. A pin is a solid cylinder that is about 3.5" long and about ¼" in diameter. Three different β-NiAlCrZr alloys were used for the investigation. The first high Cr β-NiAlCrZr alloy coating composition overlying the Rene N5 pin comprised about 59.2 weight percent Ni, 27 weight percent Al, about 12 weight percent Cr and about 1.8 weight percent, the second β-NiAlCrZr. The second high Al β-NiAlCrZr alloy coating composition overlying the Rene N5 pin comprised about 55 weight percent Ni, about 32 weight percent Al, about 12 weight percent Cr and about 1 weight percent Zr. The third β-NiAlCrZr alloy coating composition overlying the Rene N5 pin comprised about 60 weight percent Ni, about 27 weight percent Al, about 12 weight percent Cr and about 1 weight percent Zr. A total of 27 pin samples were prepared, 9 samples with each test β-NiAlCrZr alloy. After the β-NiAlCrZr was initially applied to the pins with an HVOF process, the pins were subjected to a diffusion heat treatment (DHT). The DHT was performed in a vacuum. From 600° F. (315° C.), the pins were increased in temperature at a rate of about 1700° F. (925° C.) per hour to about 2000° F. (1095° C.). The pins were held at about 2000° F. for about two hours. The pins were then allowed to cool to room temperature. Three pins per chemistry were subjected to a cyclic hot corrosion/oxidation (CHCO) test as a baseline for performance.

Three pins were treated with a first higher aluminum activity VPA process of the present invention. The higher aluminum activity VPA process was run at about 1900° F. (1040° C.) for a period of about six hours. One of the higher activity aluminum pins was then used for a CHCO test to evaluate performance of the high aluminum activity VPA process. One of the higher activity aluminum pins was then subjected to an electron microprobe analysis (EMPA) to evaluate the chemistry near the surface of the pins.

Two sets of three pins, each pin in the each set having a different test β-NiAlCrZr alloy coating were treated with a second low aluminum activity VPA process. The low aluminum activity VPA process was run at about 1975° F. (1080° C.) for a period of about six hours. One set of low activity aluminum pins were then used for a CHCO test to evaluate performance of the low aluminum activity VPA process. The second set of low activity aluminum pins were then subjected to an EMPA to evaluate the chemistry near the surface of the pins.

Figure 5:
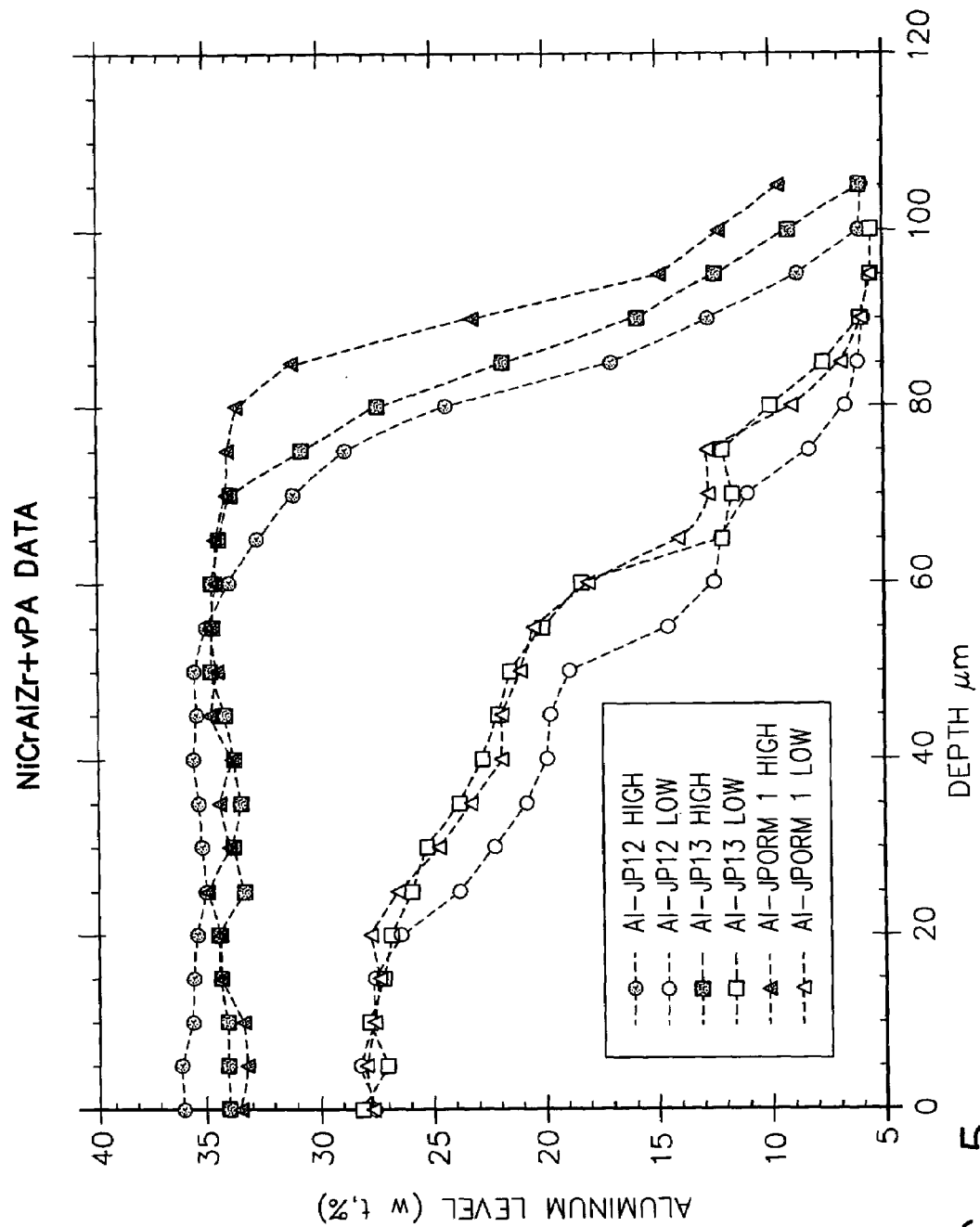
FIG. 5 is a graph showing the results of an electron microprobe analysis various β-NiAlCrZr coated Rene N5 pin samples after the samples were treated with the VPA process of the present invention.

Referring now to FIG. 5, there is seen the EMPA results for the two sets of pins in the form of a graph. The graph shows weight percent as the y-axis and the depth into the surface of the pin in micrometers as the x-axis, well into the surface of the original β-NiAlCrZr layer on the surface of the pins. As defined on the graph, the notation "Al-JP12" refers to a proprietary base β-NiAlCrZr coating layer comprising about 27 weight percent aluminum, about 12 weight percent chromium, about 1.8 weight percent zirconium, with the balance nickel. As defined on the graph, the notation "Al-JP13" refers to a proprietary base β-NiAlCrZr coating layer comprising about 32 weight percent aluminum, about 12 weight percent chromium, about 1.0 weight percent zirconium, with the balance nickel. As defined on the graph, the notation "Al-JP0" refers to a proprietary base β-NiAlCrZr coating layer comprising about 27 weight percent aluminum, about 12 weight percent chromium, about 1.0 weight percent zirconium, with the balance nickel. The notation "LOW" refers to two VPA process parameters having relatively low activity as compared to the other process parameter where the process was run with sufficient aluminum donor material to saturate the VPA atmosphere, the temperature was about 1900° F. (1040° C.), about 50 g of AlF$_3$ activator was used, the transport gas was Ar, a total of about 40 ft$^3$ of transport gas was provided, and the process was run for a time of about 6 hours. The notation "HIGH" refers to VPA process parameters having relatively high activity as compared to the other process parameter. The "HIGH" VPA process was run with sufficient aluminum donor material to saturate the VPA atmosphere and the temperature was about 1975° F. (1080° C.). In addition, about 60 g of AlF$_3$ activator was used, the transport gas was Ar, a total of about 20 ft$^3$ of transport gas was provided, and the process was run for a time of about 6 hours.

The graph clearly shows that much more aluminum was diffused into the surface of the pins that were subjected to the high aluminum activity VPA process. The relatively low aluminum level throughout the low aluminum activity pins demonstrates that very little aluminum was diffused into the β-NiAlCrZr layer of the pins. Surprisingly, the aluminum applied at lower activity led to little to no diffusion of aluminum from the VPA process into the previously deposited β-NiAl base coatings. Conversely, the higher activity conditions led to substantial diffusion of the aluminum into the β-NiAl base coatings. With usual nickel-base, cobalt-base and iron-base superalloy substrates, low aluminum activity leads to extensive aluminum levels at the surface of the substrate. The combination of the relatively low aluminum activity and process temperatures has led to a desirable result.

The CHCO results were as follows: The low aluminum activity first test β-NiAlCrZr pin failed after 320 cycles; The low aluminum activity second test β-NiAlCrZr pin failed after 321 cycles; The low aluminum activity third test β-NiAlCrZr pin failed after 401 cycles; All three high aluminum activity pins failed after 418 cycles; The first and third test β-NiAlCrZr pins failed after 378 cycles; The second test βNiAlCrZr pin failed after 365 cycles. The CHCO results demonstrated that the low aluminum activity third test β-NiAlCrZr alloy performed better than the bare pin sample and the high aluminum activity pin with the same alloy on a per mil basis and performed better than the other two low aluminum activity test β-NiAlCrZr alloys. The performances of the low temperature aluminided samples were in line with those of the uncoated samples (within one inspection cycle) on a per mil basis. The higher temperature (high activity) VPA-overcoated samples appear to have longer lives, but the apparent longer lives resulted because of the thicker coating. The high activity VPA-overcoated samples actually have shorter lives on a per mil basis.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for forming diffusion aluminide coatings on an uncoated portion of a surface of a substrate, without interdiffusing a sufficient amount of aluminum into a coating layer to adversely affect the coating growth potential or mechanical properties of said coating layer, comprising the steps of:
providing a metal substrate comprising an external surface and an internal passage therein defined by an internal surface, at least a portion of the external surface of the substrate being coated, but at least a portion of the internal surface being uncoated, with a coating layer selected from the group consisting of β-NiAl-base, MCrAlX, a line-of sight diffusion aluminide, a non-line-of-sight diffusion aluminide, a pack diffusion aluminide, and a slurry diffusion aluminide on said substrate, wherein the substrate is a gas turbine airfoil, and wherein the internal passage is a plurality of internal cooling passages which extend through an interior of the airfoil;
cleaning the external surface of the substrate;
subjecting the metal substrate to an aluminum vapor phase deposition process performed using a fluorine-containing activator selected from the group consisting of $AlF_3$, $CrF_3$, $NH_4F$, and combinations thereof, at a rate in the range of about 0.036 mols of fluorine per $ft^3$/hr of transport gas to about 0.18 mols of fluorine per $ft^3$/hr of transport gas, at a temperature in the range of about 1350° F. to about 1925° F., using a transport gas selected from the group consisting of argon, nitrogen, hydrogen, and combinations thereof, the transport gas being provided at a flow rate in the range of about 20 $ft^3$/hr to about 120 $ft^3$/hr for a period of time in the range of about 2 hours to about 10 hours; and
cooling the substrate.

2. The process of claim 1, wherein the coating layer is a β-NiAl-base layer.

3. The process of claim 2, wherein the coating layer is a β-NiAlCrZr layer.

4. The process of claim 3, wherein the β-NiAlCrZr coating layer comprises about 53.5 weight percent nickel to about 64.5 weight percent nickel, about 20 weight to about 30 weight percent aluminum, about 2 weight percent to about 15 weight percent chromium, and about 0.5 weight percent to about 1.5 weight percent zirconium.

5. The process of claim 4, wherein the β-NiAlCrZr coating layer comprises about 60 weight percent nickel, about 27 weight percent aluminum, about 12 weight percent chromium, and about 1 weight percent zirconium.

6. The process of claim 5, wherein the aluminum vapor phase deposition process is performed using an $AlF_3$ activator at a rate of 0.036 mols of fluorine per $ft^3$/hr of transport gas, at a temperature of about 1900° F., the transport gas being provided at a flow rate of about 20 $ft^3$/hr for a period of time of about 6 hours.

7. The process of claim 4, wherein the aluminum vapor phase deposition process is performed using an $AlF_3$ activator at a rate of 0.036 mols of fluorine per $ft^3$/hr of transport gas, at a temperature of about 1900° F., the transport gas being provided at a flow rate of about 20 $ft^3$/hr for a period of time of about 6 hours.

8. The process of claim 1, wherein the coating layer is a non-line-of-sight diffusion aluminide layer comprising aluminum, chromium, and a material selected from the group consisting of a reactive element, a noble metal, and combinations thereof.

9. The process of claim 1, wherein the coating is a pack diffusion aluminide layer comprising aluminum, chromium, and a material selected from the group consisting of a reactive element, a noble metal, and combinations thereof.

10. The process of claim 1, wherein the coating is a slurry diffusion aluminide layer comprising aluminum, chromium, and a material selected from the group consisting of a reactive element, a noble metal, and combinations thereof.

11. The process of claim 1, wherein the coating layer is MCrAlX, where M is a metal selected from the group consisting of iron, cobalt, nickel, and combinations thereof.

12. The process of claim 1 further comprising the additional step of densifying and smoothing the coating layer using a shot peen treatment prior to the step of cleaning the external surface of the substrate.

13. The process of claim 1 further comprising the additional step of masking a preselected external portion of the substrate prior to the step of subjecting the metal substrate to an aluminum vapor phase deposition process.

14. The process of claim 1 further comprising the additional step of subjecting the coating layer to a surface finish treatment to reduce the roughness of the coating layer.

15. The process of claim 1 further comprising the additional step of applying a thermal bond coat to the coating layer.

16. The process of claim 14 further comprising the additional step of applying a thermal bond coat to the coating layer.

17. The process of claim 1, wherein the aluminum vapor phase deposition process is performed using an $AlF_3$ activator at a rate of 0.036 mols of fluorine per $ft^3$/hr of transport gas, at a temperature of about 1900° F., the transport gas being provided at a flow rate of about 20 $ft^3$/hr for a period of time of about 6 hours.

18. A process for forming diffusion aluminide coatings on an uncoated portion of a surface of a substrate, without interdiffusing a sufficient amount of aluminum into a coating layer to adversely affect the coating growth potential or mechanical properties of said coating layer, comprising the steps of:
providing a metal substrate comprising an external surface and an internal passage therein defined by an internal surface, at least a portion of the external surface of the substrate being coated, but at least a portion of the internal surface being uncoated, with a coating layer selected from the group consisting of β-NiAl-base, wherein the β-NiAl-base is β-NiAlCrZr, MCrAlX, a line-of sight diffusion aluminide, a nonline-of-sight diffusion aluminide, wherein the non-line-of-sight diffusion aluminide layer comprising aluminum, chromium, and a material selected from the group consisting of a reactive element, a noble metal, and combinations thereof, a pack diffusion aluminide, and a slurry diffusion aluminide on said substrate, wherein the substrate is a gas turbine airfoil, and wherein the internal passage is a plurality of internal cooling passages which extend through an interior of the airfoil;

cleaning the external surface of the substrate;

subjecting the metal substrate to an aluminum vapor phase deposition process performed using a fluorine-containing activator selected from the group consisting of $AlF_3$, $CrF_3$, $NH_4F$, and combinations thereof, at a rate in the range of about 0.036 mols of fluorine per $ft^3$/hr of transport gas to about 0.18 mols of fluorine per $ft^3$/hr of transport gas, at a temperature in the range of about 1350° F. to about 1925° F., using a transport gas selected from the group consisting of argon, nitrogen, hydrogen, and combinations thereof, the transport gas being provided at a flow rate in the range of about 20 $ft^3$/hr to about 120 $ft^3$/hr for a period of time in the range of about 2 hours to about 10 hours; and cooling the substrate.

19. A process for forming diffusion aluminide coatings on an uncoated portion of a surface of a substrate, without interdiffusing a sufficient amount of aluminum into a coating layer to adversely affect the coating growth potential or mechanical properties of said coating layer, comprising the steps of:

providing a metal substrate comprising an external surface and an internal passage therein defined by an internal surface, at least a portion of the external surface of the substrate being coated, but at least a portion of the internal surface being uncoated, with a coating layer selected from the group consisting of β-NiAl-base, wherein the β-NiAl-base is β-NiAlCrZr, MCrAlX, a line-of sight diffusion aluminide, a non-line-of-sight diffusion aluminide, a pack diffusion aluminide, wherein the pack diffusion aluminide layer comprising aluminum, chromium, and a material selected from the group consisting of a reactive element, a noble metal, and combinations thereof, and a slurry diffusion aluminide on said substrate, wherein the substrate is a gas turbine airfoil, and wherein the internal passage is a plurality of internal cooling passages which extend through an interior of the airfoil;

cleaning the external surface of the substrate;

subjecting the metal substrate to an aluminum vapor phase deposition process performed using a fluorine-containing activator selected from the group consisting of $AlF_3$, $CrF_3$, $NH_4F$, and combinations thereof, at a rate in the range of about 0.036 mols of fluorine per $ft^3$/hr of transport gas to about 0.18 mols of fluorine per $ft^3$/hr of transport gas, at a temperature in the range of about 1350° F. to about 1925° F., using a transport gas selected from the group consisting of argon, nitrogen, hydrogen, and combinations thereof, the transport gas being provided at a flow rate in the range of about 20 $ft^3$/hr to about 120 $ft^3$/hr for a period of time in the range of about 2 hours to about 10 hours; and cooling the substrate.

20. The process of claim 19, wherein the coating is a slurry diffusion aluminide layer comprising aluminum, chromium, and a material selected from the group consisting of a reactive element, a noble metal, and combinations thereof.

* * * * *